(No Model.)
C. RICHARD.
STEAM TRAP.
No. 405,804. Patented June 25, 1889.
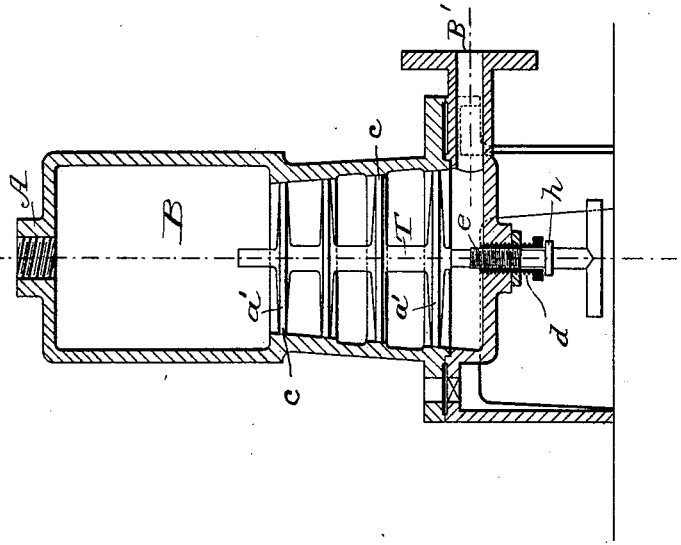
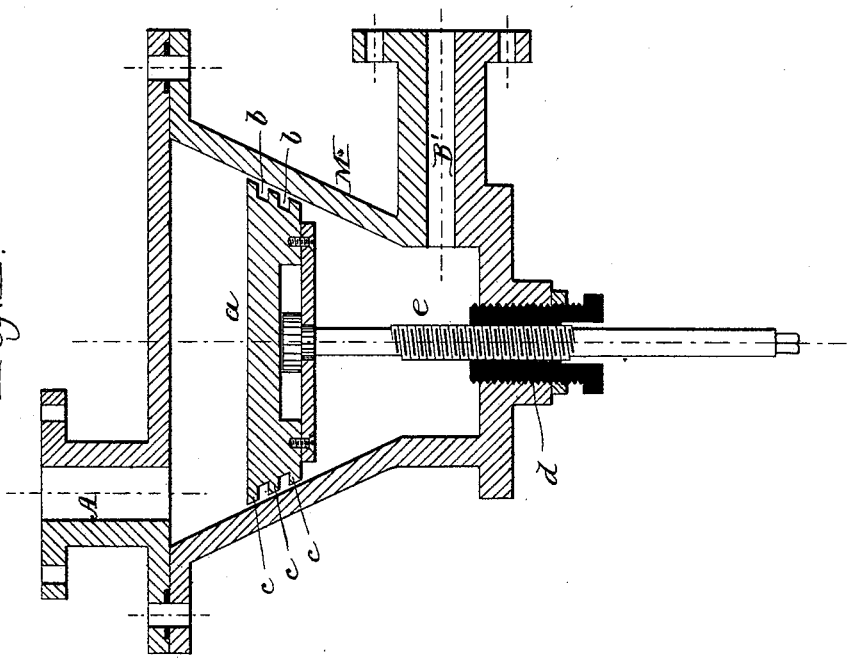
WITNESSES:
INVENTOR:
By
Attorney.

UNITED STATES PATENT OFFICE.

CHARLES RICHARD, OF PARIS, FRANCE.

STEAM-TRAP.

SPECIFICATION forming part of Letters Patent No. 405,804, dated June 25, 1889.

Application filed November 26, 1888. Serial No. 291,846. (No model.) Patented in France February 13, 1885, No. 167,014; in England September 8, 1885, No. 10,630, and February 17, 1887, No. 2,500, and in Belgium January 11, 1886, No. 71,571.

*To all whom it may concern:*

Be it known that I, CHARLES RICHARD, a citizen of the French Republic, and a resident of Paris, in the Republic of France, have invented certain new and useful Improvements in Steam-Traps, (for which I have obtained Letters Patent as follows: in France, No. 167,014, dated February 13, 1885; in England, No. 10,630, dated September 8, 1885, and No. 2,500, dated February 17, 1887, and in Belgium, No. 71,571, dated January 11, 1886;) and I do hereby declare that the following is a full, clear, and exact description of the same.

The invention has for its object a steam-trap for drawing off the water carried along by the steam, or which might have been formed by condensation in the pipe. This trap is self-acting and characterized by the formation of successive discharges, allowing the gradual reduction of the pressure of the steam and the water, so as to make it finally equal to the atmospheric pressure.

In the annexed drawings, Figure 1 shows a vertical section of a self-acting steam-trap of this description, and Fig. 2 is a similar view of a modified construction of trap also embodying my invention.

M is a casing of a conical shape, communicating at its upper end, by means of the admission-pipe A, with the steam-pipe from which the water is to be drawn off. In this conical casing M a disk $a$ is located, made of a material more extensible by heat than that of the casing M and of the same degree of conicity, and provided with grooves $b$ and projections $c$, constituting in effect a series of connected plates or disks producing discharges of the water and the steam entered in the trap above the disk $a$. It will be understood that the disk $a$ being not entirely joined with the inside of the casing M, the pressure of the steam and the water while passing from the space above the disk to the first groove, from the first groove to the second, from the second to the third, or to the chamber under the disk, will decrease in such a way as to become zero, or equal to the atmospheric pressure. Consequently the water will gradually and regularly flow from the upper chamber above the disk to the lower chamber below the disk and then be discharged by the pipe B'.

If the water is entirely drawn off, the disk $a$ is of course brought into contact with the steam, and being made of a more extensible material than the casing M will close tightly against this casing and prevent the escape of the steam.

The apparatus should be regulated once and for all, so that no steam may be allowed to escape through the space between the disk and the casing. This regulation is made by means of the screw-rod $e$, made preferably of iron or bronze. This rod is provided at its upper end with a head inclosed against the under side of the disk $a$ in such a manner that it can be freely turned. A double screw $d$ allows a very accurate adjustment of the disk $a$. For cleansing the apparatus it is sufficient to raise the disk, and after the cleansing is done to lower it back into its original working position.

Fig. 2 shows a vertical section of an automatic steam-trap of the same system, wherein the grooves $b$ and the projection $c$ are developed to such an extent as to form a series of plates or disks $a'$ mutually separated and reenforced so as to prevent warping. In this arrangement the taper of the disks and of the casing is made in the opposite direction, so that for cleaning the apparatus the disks are lowered, instead of being raised. The steam enters through the opening A, passing first into a chamber B, in which it expands, and from there it acts upon the disks or plates $a'$, which, as heretofore, produce a series of discharges, allowing the water to flow off, while at the same time the escape of the steam is prevented. These disks or plates $a'$ are connected by a rod T, and in the same manner moved by a screw $e$.

The apparatus having been regulated once is rapidly brought back into working position by means of a combination of double screws $d\ e$, which enables me, when the screw-bushing $d$ has been put in proper place, to obtain at once the exact position of the disks $a'$ by screwing up the spindle $e$ until its collar $h$ bears against the bush $d$.

The rod T, connecting the disk or disks, may have any suitable shape, and may be connected or not with the lower stem and may be moved in any suitable manner.

The chamber B, which I have mentioned in connection with the arrangement of the apparatus shown in Fig. 2, can, of course, also be applied with the arrangement as shown in Fig. 1.

What I claim as new, and desire to secure by Letters Patent, is—

1. In a self-acting steam-trap, the combination, with a conical or tapered casing, of a series of connected plates or disks situated at different points in said casing, of correspondingly-different diameters, and adapted to form, in conjunction with the casing, successive discharge-openings for the steam, substantially as set forth.

2. In a self-acting steam-trap, the combination, with a conical or tapered casing, of a series of connected plates or disks of a material more extensible by heat than is the material of the casing, situated at different points in said casing, of correspondingly-different diameters, and adapted to form, in conjunction with the casing, successive discharge-openings for the steam, substantially as set forth.

3. In a self-acting steam-trap, the combination, with a conical or tapered casing, of a series of connected plates or disks situated at different points in said casing, of correspondingly-different diameters, and adapted to form, in conjunction with the casing, successive discharge-openings for the steam, and a chamber in which the steam expands before acting upon said disks, substantially as set forth.

4. The combination, with the tapered casing, of the series of connected disks or plates having the edges $c$ adapted to fit the casing and form successive discharge-openings for the steam, as described, bushing $d$, threaded externally and internally, and the threaded stem $e$, connected with the disks and engaging the bushing, substantially as set forth.

In witness whereof I have hereunto set my hand in presence of two witnesses.

CHARLES RICHARD.

Witnesses:
JULES FAYOLLEY,
AUG. VINCK.